Patented Nov. 27, 1934

1,982,163

UNITED STATES PATENT OFFICE 1,982,163

SULPHAMINO-PHENYL-METHYL-PYRAZOLONES

Winfrid Hentrich, Wiesdorf-on-the-Rhine, and Josef Hilger, Cologne-Mulheim, Germany, assignors to General Aniline Works, Inc., New York, N. Y., a corporation of Delaware No Drawing. Application November 5, 1929, Serial No. 405,056. In Germany November 8, 1928

5 Claims. (Cl. 260—45)

The present invention relates to a process of preparing hydroxy sulphamic acids and to the new products obtainable thereby.

Sulphamic acids of the cyclic series containing free hydroxy groups in addition to the sulphamic acid groups are hitherto unknown.

In accordance with the present invention cyclic hydroxy sulphamic acids which may be represented by the probable general formula:

wherein $x$ stands for a 5-hydroxypyrazole radical, and R stands for an aryl radical, are prepared by causing an N-sulphonating agent, such as chlorosulphonic acid, a chlorosulphonic acid ester, a solution of sulphur trioxide in tetrachlorethane, pyridine sulphuric acid (compare Berichte der Deutschen Chemischen Gesellschaft, vol. 59, page 1976, Berichte, vol. 60, page 1174 and Beilstein, Handbuch der Organischen Chemie, 3rd edition, vol. 4, page 114) to react upon a 5-hydroxyaminoaryl pyrazole which may be represented by the probable general formula:

wherein $x$ and R mean the same as stated above.

The process is preferably carried out by introducing a sulphonating agent, especially chlorosulphonic acid, into an organic inert diluent, such as chlorobenzene, or advantageously into a diluent which at the same time acts as an acid binding agent, for example, pyridine, quinoline and the like, while cooling, then adding the calculated amount of an amino hydroxy compound of the cylic series, and gently heating the mixture, say to about 40–50° C. for some hours.

The smooth course of the reaction and, above all, the fact that the hydroxy group is not attacked in this reaction were not to be expected.

The new sulphamic hydroxy compounds are generally easily soluble in form of their alkali metal salts; in acid aqueous solution the sulphamic group is split off. They are valuable intermediate products for the manufacture of azo dyestuffs and are coupling components, particularly for those azo dyestuffs, direct dyeings of which on vegetable fibers are after-treated with metallic salts for the purpose of increasing the fastness to washing and light.

The invention is illustrated by the following example, without being restricted thereto:

*Example:* 116 parts by weight of chlorosulphonic acid are introduced with stirring at a temperature below 0° C. into 1000 parts by weight of pyridine. 189 parts by weight of 1-(3'-aminophenyl)-3-methyl-5-hydroxypyrazole in a finely divided state are then added. The mixture is heated to 50° C. for two hours with stirring, water being excluded. On cooling the mixture is rendered alkaline with sodium carbonate and the pyridine is distilled off with steam. The sodium salt of the sulphamic acid formed having in its free state the probable formula:

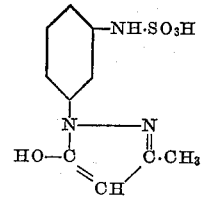

is extremely readily soluble in water; the further working up of the same is best carried out in solution. Thus is obtained, for example, by coupling two molecules of 1-(3'-sulphaminophenyl)-3-methyl-5-hydroxypyrazole or one molecule thereof and one molecule of aceto-acetic acid-o-anisidide-sulphonic acid with one molecule of the tetrazo-compound of 4.4'-diamino-diphenylurea-3,3'-dicarboxylic acid dyestuffs, the direct dyeings of which on cotton give on after-treatment with copper salts orange shades, very fast to light and of excellent fastness to washing.

In an exactly analogous manner there is obtained from 1-(3'-aminophenyl)-5-hydroxypyrazole-3-carboxylic acid the 1-(3'-sulphaminophenyl)-5-hydroxypyrazole-3-carboxylic acid. The use of a solution of sulphur trioxide in tetrachlorethane or of chlorosulphonic acid ethyl ester leads to the same hydroxy sulphamic acids.

We claim:

1. The process which comprises causing about molecular quantities of a 5-hydroxyaminophenyl pyrazole and a chlorosulphonic acid to react upon each other in the presence of an acid-binding agent at a temperature of about 40 to 50° C. for several hours.

2. The process which comprises causing about molecular quantities of 1-(3'-aminophenyl)-3-methyl-5-hydroxypyrazole and chlorosulphonic acid, to react upon each other in the presence of an acid-binding agent at a temperature of 40 to 50° C. for several hours.

3. The process which comprises introducing into pyridine chlorosulphonic acid while cooling, adding thereto an equimolecular (calculated on the amount of the chlorosulphonic acid) quantity of 1-(3'-aminophenyl)-3-methyl-5-hydroxypyrazole and heating the mixture to about 50° C. for 2 hours.

4. As new products hydroxy sulphamic acids of the cyclic series of the general formula:

$$x-NH-SO_3H$$

wherein $x$ stands for the radical of 5-hydroxy-phenyl-pyrazole, and wherein the sulphamino group is attached to the phenyl nucleus of the phenyl-pyrazole, being in form of their alkali metal salts water soluble substances, the sulphamic acid group of which can be split off in aqueous acid solution, and being valuable intermediate products in the manufacture of azo dyestuffs.

5. As a new product the compound of the formula:

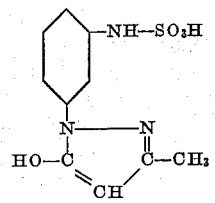

being in form of its alkali metal salts a water soluble substance, the sulphamic acid group of which can be split off in aqueous acid solution, and being a valuable intermediate product in the manufacture of azo dyestuffs.

WINFRID HENTRICH. [L. S.]
JOSEF HILGER. [L. S.]